April 16, 1929.  E. J. SOKOL  1,709,099
SHIELD FOR TWO-ROW CORN CULTIVATORS
Filed July 6, 1927  2 Sheets-Sheet 1
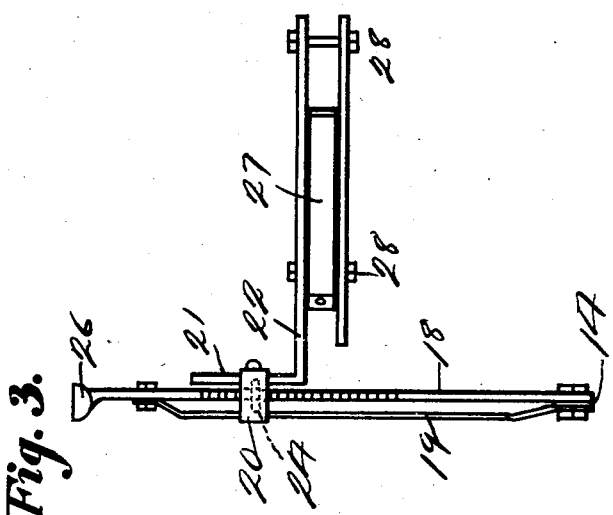
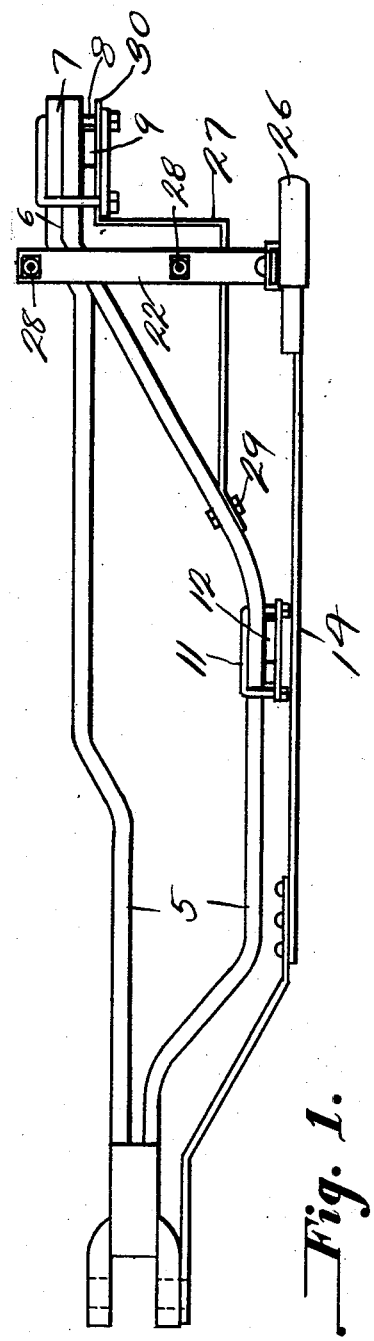
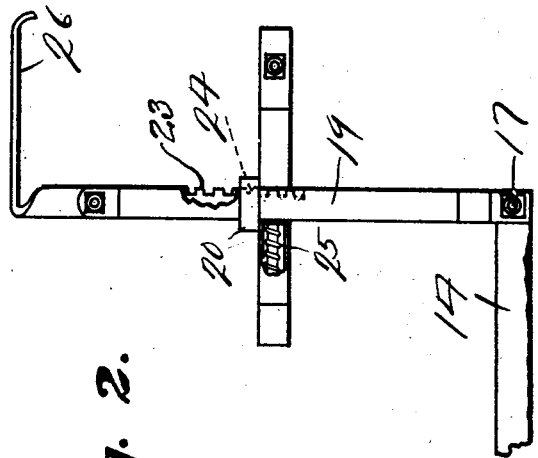
INVENTOR.
E. J. Sokol
BY
James W. Martin
ATTORNEY.

April 16, 1929. E. J. SOKOL 1,709,099
SHIELD FOR TWO-ROW CORN CULTIVATORS
Filed July 6, 1927    2 Sheets-Sheet 2

INVENTOR.
E. J. Sokol
BY
James W. Martin
ATTORNEY.

Patented Apr. 16, 1929.

1,709,099

UNITED STATES PATENT OFFICE.

EDWARD J. SOKOL, OF ST. EDWARD, NEBRASKA.

SHIELD FOR TWO-ROW CORN CULTIVATORS.

Application filed July 6, 1927. Serial No. 203,723.

The invention relates to two row cultivator shields, and has for its object to provide a device of this character which may be easily and quickly applied to a two row cultivator, and which shield will prevent the cultivator shovels from throwing clods of dirt and the like onto small plants and damaging the same.

A further object is to provide the shield with a forwardly extending arm pivoted to the beam arch, and with an upwardly extending toothed bar pivotally connected to its rear end and guided in a yoke and positioned whereby the rear end of the shield may be adjusted downwardly or upwardly as desired.

A further object is to provide the cultivator beams with a transverse bracket adjacent their rear ends and which brackets support the guide yoke for the toothed operating bar. Also to provide a bracket attached to the rearwardly inclined portion of one of the cultivator beams and clamped in the shovel bar clamp and forming an additional support for the transversely disposed bracket.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:

Figure 1 is a top plan view of the device, showing the same applied to cultivator beams.

Figure 2 is a side elevation of the locking mechanism and lever mechanism.

Figure 3 is a rear elevation of the lever and the supporting bracket.

Figure 4:
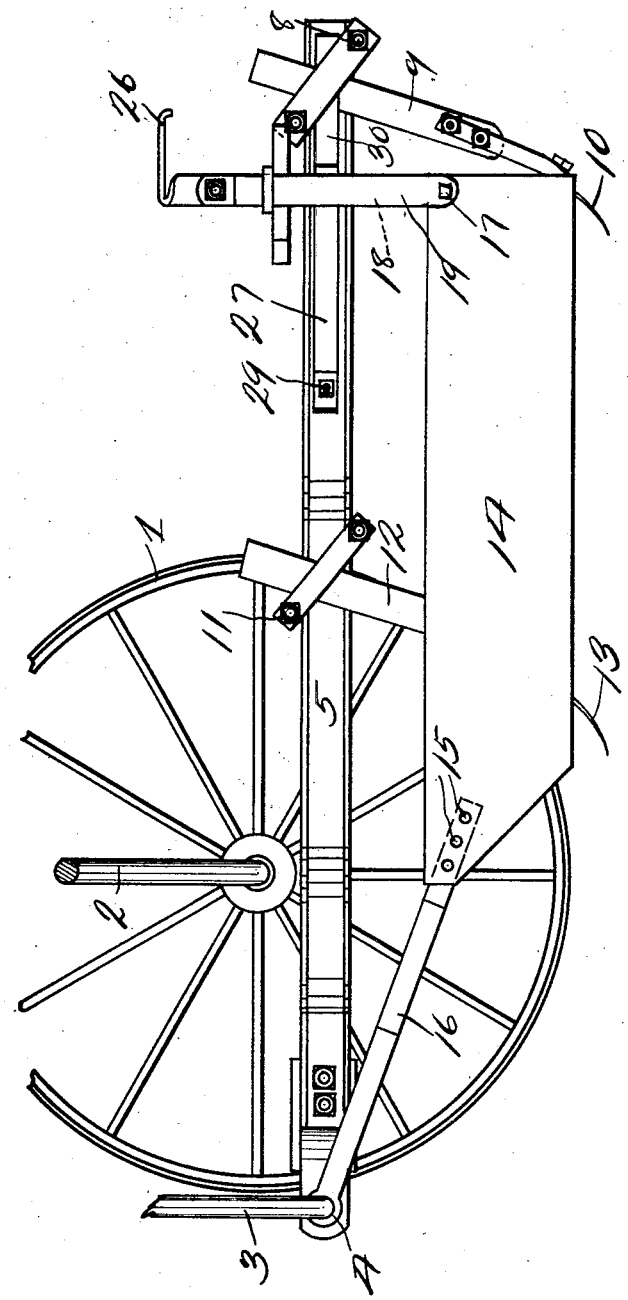
Figure 4 is a vertical longitudinal sectional view through the cultivator, showing the shield and its operating mechanism in side elevation.

Referring to the drawings, the numeral 1 designates one of the wheels of a conventional form of two row cultivator and 2 the axle thereof. Pivotally secured to the arch 3 of the cultivator at 4 are rearwardly extending cultivator beams 5, which beams extend rearwardly and merge together at 6, thereby forming a portion 7 to which is clamped by means of a U-clamp 8, a shovel bar 9, the lower end of which is provided with a conventional form of shovel 10. Clamped to the outer side of one of the beams 5 by means of a U-clamp 11 is a second shovel bar 12 having a shovel 13 on its lower end. It has been found in cultivators that where they are used between rows of young plants, the shovels, during the plowing operation often throw and force clods of dirt onto small plants, thereby damaging or destroying the same, and to obviate this difficulty, the longitudinally disposed shield 14 is provided, which shield is disposed in a vertical plane.

Secured at 15 to the forward end of the shield 14 is an upwardly and forwardly extending arm 16, the forward end of which is pivotally mounted at 4 on the cultivator arch 3, therefore the shield may pivotally move in a vertical longitudinal plane. Pivotally connected at 17 to the rear end of the shield 14 is an upwardly extending lever 18 and brace bar 19 carried by said lever, and which lever and brace bar extend upwardly through a yoke 20 carried by the arm 21 of the bracket 22, and is provided with a plurality of teeth 23 adapted to cooperate with the tooth 24 inside of the yoke 20 for holding the shield 14 in various adjusted positions as desired. The lever 18 is forced towards the tooth 24 by means of a coiled spring 25, and therefore will automatically latch. The upper end of the lever 18 is provided with an angularly disposed portion 26 within easy reach of the operator, therefore it will be seen that the operator can easily and quickly lower or raise the shield to any desired elevation for use, and when the shield is not in use, or the machine is being transported from field to field, the shield may be held out of engagement with the ground, or in a position where it will not engage the ground.

The bracket 22 extends across an angularly shaped bracket 27, which assists in supporting the bracket 22, and across the rear ends of the beams 5 and is clamped thereto by means of the bolts 28, thereby rigidly attaching the bracket 22 to the beams and without modifying the construction of the beams. One end of the bracket 27 is anchored at 29 to one of the beams 5, and the arm 30 thereof is clamped by the U-shaped clamp 8; therefore it will be seen that the bracket 27 is securely clamped in position and in the plane of the beams.

From the above it will be seen that a plant shield is provided, which is simple in construction, the parts reduced to a minimum, and one which may be easily and quickly applied to a conventional form of two row cultivator, without varying the construction thereof.

The invention having been set forth what is claimed as new and useful is:—

1. The combination with a cultivator having a cultivator arch, cultivator beams extending rearwardly from said arch, of a vertically and longitudinally disposed shield, said shield having a forwardly extending arm pivotally connected to the arch, a bracket extending transversely of the beams and terminating to one side thereof adjacent the shield, a toothed lever pivotally connected to the rear end of the shield, said toothed lever extending through a yoke, a tooth within said yoke, and with which the toothed lever cooperates, a handle member carried by the upper end of the lever, said yoke being carried by the transversely disposed bracket, and a horizontally disposed bracket connected to the side of one of the beams and forming an additional support for the transversely disposed bracket.

2. The combination with the rear ends of the beams of a two row cultivator, a plant shield to one side of said beam, of means for supporting said shield, said means comprising a transversely disposed bracket clamped to the rear ends of said beams, a lever connected to the plant shield and cooperating with said transversely disposed bracket, a cultivator bar clamp carried by the rear ends of the beams, an angularly shaped supporting bar to one side of the beams and anchored thereto, one end of said angularly shaped supported bar being anchored in the cultivator bar clamp.

In testimony whereof I hereunto affix my signature.

EDWARD J. SOKOL.